United States Patent [19]

Stinson et al.

[11] Patent Number: 4,757,439
[45] Date of Patent: Jul. 12, 1988

[54] MEMORY BUS ARCHITECTURE

[75] Inventors: Gene R. Stinson, Los Gatos; Anna S. Williams, Sunnyvale; Maximilian P. Jedda, Sunnyvale, all of Calif.

[73] Assignee: Measurex Corporation, Cupertino, Calif.

[21] Appl. No.: 70,096

[22] Filed: Jul. 6, 1987

Related U.S. Application Data

[63] Continuation of Ser. No. 667,865, Nov. 2, 1984, abandoned.

[51] Int. Cl.⁴ ..................... G06F 13/40; G06F 13/42
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 4,240,138 | 12/1980 | Chauvel | 364/200 |
| 4,257,095 | 3/1981 | Nadir | 364/200 |
| 4,464,715 | 8/1984 | Stamm | 364/200 |

FOREIGN PATENT DOCUMENTS 3007939  3/1980  Fed. Rep. of Germany .

OTHER PUBLICATIONS

Intel, pp. B-101 to B-119, Aug. 1981, (Intel 8288 and 8289 Devices).
Hall, "Microprocessors and Digital Systems", 1980, p. 283.
MacKenna et al., "Backup Support Gives VME Bus Powerful Milti-Processing Architecture", 3/22/84, *Electronics*, pp. 132-138.
Altnether, "Better Processor Performance Via Global Memory", 1/82, *Computer Design*, vol. 21, No. 1, pp. 155-164.
Boberg, "Major Standardization Issues of the Proposed IEEEE 796 Bus-Multibus", 11/82, vol. 6, No. 9, pp. 471-474.
Philipson et al., "A Communication Structure for a Multiprocessor Computer With Distributed Global Memory", 1983, ACM, pp. 334-340.

*Primary Examiner*—Gary V. Harkcom
*Assistant Examiner*—C. H. Lynt
*Attorney, Agent, or Firm*—Spensley Horn Jubas & Lubitz

[57] ABSTRACT

A memory bus architecture uses a standard unified bus, microprocessor system, and separate memory bus. Access to memory banks coupled to the memory bus may be made by subsystems communicating over the unified bus using the standard protocol of the unified bus, or may be made by the microprocessor using an access protocol method wherein an accessed memory bank generates an acknowledgement signal upon receipt of a READ or WRITE command rather than after the completion of the respective READ or WRITE operation. A further aspect is an Early READ/WRITE circuit that rapidly detects the initiation of a READ or WRITE command by the microprocessor by decoding standard microprocessor status signals in order to generally commence a READ or WRITE operation prior to the time that a normal READ or WRITE operation would be commenced.

1 Claim, 4 Drawing Sheets

MEMORY BUS ARCHITECTURE

This is a continutation of application Ser. No. 667,865 filed on Nov. 2, 1984 now abandoned.

BACKGROUND OF THE INVENTION

1. Field of the Invention

This invention relates to an electronic microprocessor system, and in particular to an improved performance memory bus architecture for a microprocessor system.

2. Prior Art

In the field of microprocessors, it is common to have various portions of a microprocessor-based system (such as the microprocessor itself, memory units, and interface circuits for coupling the system to storage units and communications circuits) interconnected by means of one or more communications busses. The prior art teaches various combinations of bus arthitectures, including separate buses for data, address, and control information. However, many microprocessor-based systems use a single integrated bus for data, address, and control information. For example, the Intel Corporation has developed a unified bus architecture known by the trademark "Multibus" for microprocessor system communication.

One problem with such a stardard unified bus architecture is that in certain applications where processing speed is of paramount importance (such as in real-time data processing applications), the unified bus architecture is too slow when fast data transfer between memory and the system microprocessor is desired. The problem arises beceause the unified bus architecture requires a certain protocol for reading and writing data from or to memory, which utilizes an undue amount of time in acknowledging signals from the microprocessor. However, retaining a standard unified bus within the system is advantageous, in that it allows standard circuits and interfaces to be coupled to the microprocessor system.

The present invention is used in conjunction with a standard unified bus, and improves the speed of operation between the system microprocessor and the system memory. This improved performance is achieved by providing a second, separate memory bus apart from the unified system bus but controllably connectable to the unified bus, and by anticipating READ and WRITE commands. A minimum of control signals are required for operation of the secondary memory bus, thus permitting improved processing performance for data transfers between the microprocessor and the system memory.

SUMMARY OF THE INVENTION

The improved performance which is an object of the present invention is achieved by coupling the system memory of a microprocessor system to a separate memory bus, and selectively electrically coupling the memory bus to a standard unified system bus. During operation, the microprocessor may selectively communicate over the unified bus using the standard protocol of the unified bus. When high speed memory operation is desired, the microprocessor generates address information that is decodable only by the system memory units, and the microprocessor transfers data to or from the system memory over the memory bus using a modified data transfer protocol. This modified data transfer protocol permits higher speed data transfers than the standard protocol for the unified bus. In addition, separate circuitry is provided and coupled to the microprocessor, to anticipate in most circumstances of use the occurrence of READ or WRITE commands to the system memory. This anticipation results in a substantial savings of time over the prior art method.

The novel features which are believed to be characteristic of the invention, together with further objectives and advantages thereof, will be better understood from the following description considered in conjunction with the accompanying drawings. The drawings illustrate the presently preferred embodiment of the invention by way of example. It is to be expressly understood, however, that the drawings are for the purpose of illustration and description only, and are not intended as a definition of the limits of the invention.

BRIEF DESCRIPTION OF THE DRAWINGS

Like reference numbers in the various drawings refer to like elements.

DETAILED DESCRIPTION OF THE PREFERRED EMBODIMENT

The circuitry shown in FIG. 1 comprises a basic microprocessor-based system that can be coupled to a unified bus and to the inventive memory bus through physical interface connections (not shown) to which are connected address, data, and control lines, as further described below. Only the microprocessor board itself and one or more memory banks can be connected through the memory bus. In the present embodiment, the memory bus uses a 24-bit addressing scheme where the four most significant bits have been designated the "bank" address. These four bits are used to select one of fifteen memory banks, which may be selected one at a time by the appropriate bank address. A sixteenth bank address (denoted by the hexidecimal number "F") is reserved as memory accessible only over the unified bus connected to the microprocessor circuit board.

Figure 1:
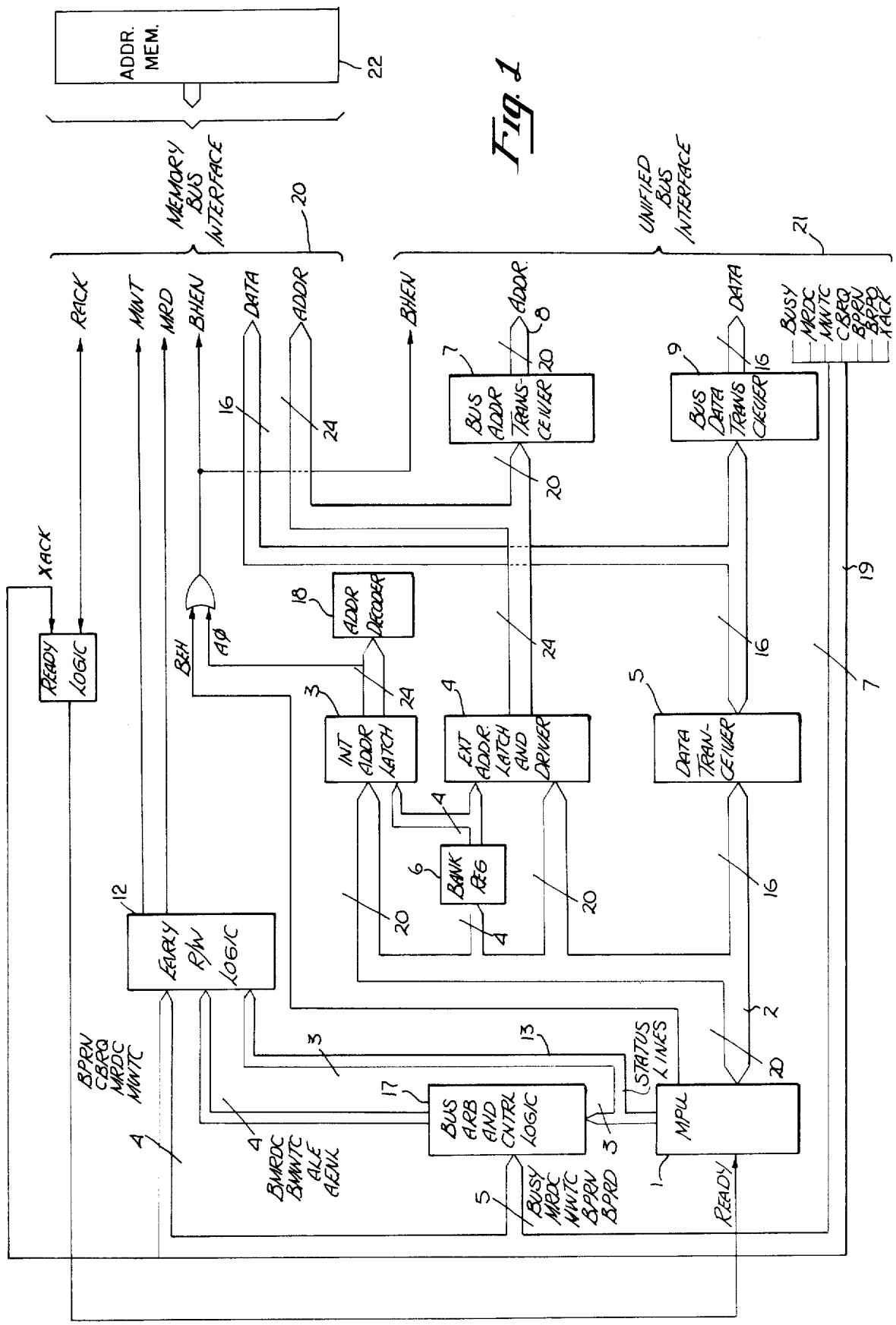
FIG. 1 is a block diagram of a microcomputer utilizing the improved performance memory bus architecture of the present invention.

FIG. 1 is a block diagram of the improved performance memory bus architecture of the preferred embodiment of the present invention. The microprocessor 1 is coupled by means of a bidirectional local address-/data bus 2 to an internal address latch 3, to an external address latch and driver 4, to a bidirectional data transceiver 5, and to a bank register circuit 6 (each number within the busses throughout FIG. 1 designate the width of the bus at that point).

The external address latch 4 has twenty-four lines of address output. Twenty of these address lines are derived directly from the microprocessor 1, and the remaining four address lines are derived from the bank register circuit 6. Twenty of these twenty-four address lines from the external address latch 4 are coupled by an address bus 22 to a unified bus address transceiver 7, which in turn is coupled to the address lines 8 of a standard unified bus interface 21. All twenty-four address lines of the address bus 22 coming from the external address latch 4 are coupled to an inventive memory bus interface 20.

The bidirectional data transceiver 5 transmits or receives up to sixteen simultaneous bits of information. The data transceiver 5 is coupled by a data bus 11 to a unified bus data transceiver 9, which in turn is coupled to the data lines 10 of the unified bus interface 21. The output of the data transceiver 5 is also coupled to the inventive memory bus interface 20 through the data bus 11.

In the present embodiment, the 16-bit wide data path of the memory bus may be used for 8-bit or 16-bit transfers in known fashion.

The microprocessor 1 also has three status lines 13 that are connected to an Early READ/WRITE logic circuit 12 and to a unified bus arbitration and control circuit 17 (which may be, for example, an Intel Corporation 8288 bus control circuit in combination with an 8289 bus arbitration circuit). Control lines 19 (further described below) from the unified bus interface 21 connect to the arbitration and control circuit 17, and to the Early READ/WRITE logic circuit 12. Other control lines (further described below) from the arbitration and control circuit 17 are also connected to the Early READ/WRITE logic circuit 12.

Typically, connections from the unified bus interface 21 to the memory bus interface 20 are through intermediate buffer circuits or transceivers that can be tristated if desired in accordance with known art. One signal line from the unified bus interface 21 is always physically connected to a corresponding signal line on the memory bus interface 20. This is the Byte High Enable signal line, BHEN, 16.

Other connections between the various circuit elements are shown in FIG. 1. Omitted for the sake of clarity are such items as clocking signals, power and ground, and tristate enable control lines, which may be in accordance with known art.

By implementing a second bus in the microcomputer system for interconnection of the microprocessor 1 with the system memory, performance is enhanced by permitting a modified READ/WRITE protocol to be used over the memory bus that is faster in operation than the protocol required by the standard unified bus. In addition, early detection of an impending READ or WRITE operation generally permits faster commencement of such operations in comparison with the standard protocol of such a unified bus.

Figure 2:
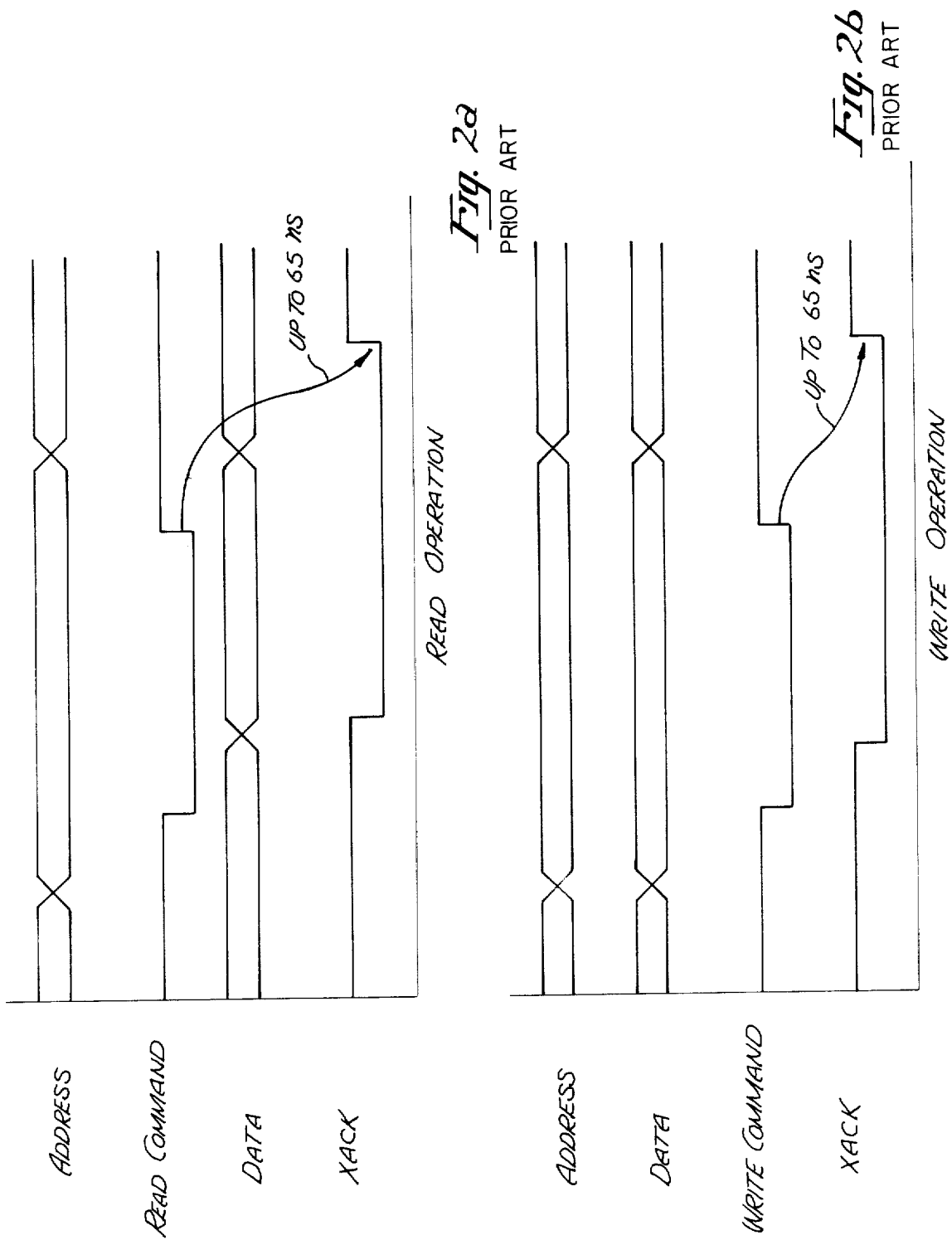
FIG. 2a is a timing diagram of a typical unified bus READ operation.
FIG. 2b is a timing diagram of a typical unified bus WRITE operation.

FIGS. 2a and 2b show generalized timing diagrams of the protocols for a READ operation and a WRITE operation for a prior art unified bus. In both the READ and WRITE operations, after a READ or WRITE command is asserted by the bus master, an XACK acknowledgement signal from the memory unit is asserted after the memory unit has completed its READ or WRITE cycle. This delay in asserting the XACK acknowledgment signal is eliminated by the present invention, and is one of the main advantages of the present invention.

In use, the improved memory bus architecture of the present invention permits two different types of memory operation: normal operation and direct memory access ("DMA") operations. Under normal operation, the microprocessor 1 is the "bus master", which controls the standard unified bus in known fashion until such time as another "bus master" subsystem requests control of the unified bus. When another subsystem does become bus master of the unified bus, the microprocessor 1 gives up control of the unified bus and opens a direct electrical channel between the unified bus interface 21 and the memory bus interface 20. This is the second mode of operation, the DMA condition. The microprocessor cannot access the system memory during this time, and must wait until the current bus master releases the unified bus and the microprocessor 1 again becomes the bus master of the unified bus.

During normal operation, the microprocessor 1 can control both the memory bus and the unified bus. The microprocessor 1 may access either bus at any time without further arbitration to gain control over either bus.

In the present invention, a READ or WRITE operation over the memory bus using the inventive protocol begins when a new address is latched into the external address latch 4 and is asserted over the address bus 11. Decoding circuitry in each memory bank coupled to the memory bus interface 20 immediately decodes this address to determine if the microprocessor 1 is selecting that memory bank for access. The status of the microprocessor 1 is determined by the Early READ/WRITE logic circuit 12 which decodes the status line 13 outputs of the microprocessor 1 to determine if the microprocessor 1 is reading or writing to memory. Depending on the status signals received from the microprocessor 1, the Early READ/WRITE logic circuit 12 will generate either a memory write (MWT) signal 14 or a memory read (MRD) signal 15, and apply it to the memory bus interface 20.

During a normal memory operation (either READ or WRITE), a Byte High Enable signal, BHEN 16, is generated as a combination of the zero address line output, A0, from internal address latch 3, and a control signal, BHE, generated in known fashion by the microprocessor 1. The BHEN signal 16 need be asserted only by the time an MRD or MWT signal has been applied to the memory bus interface 20.

Figure 3:
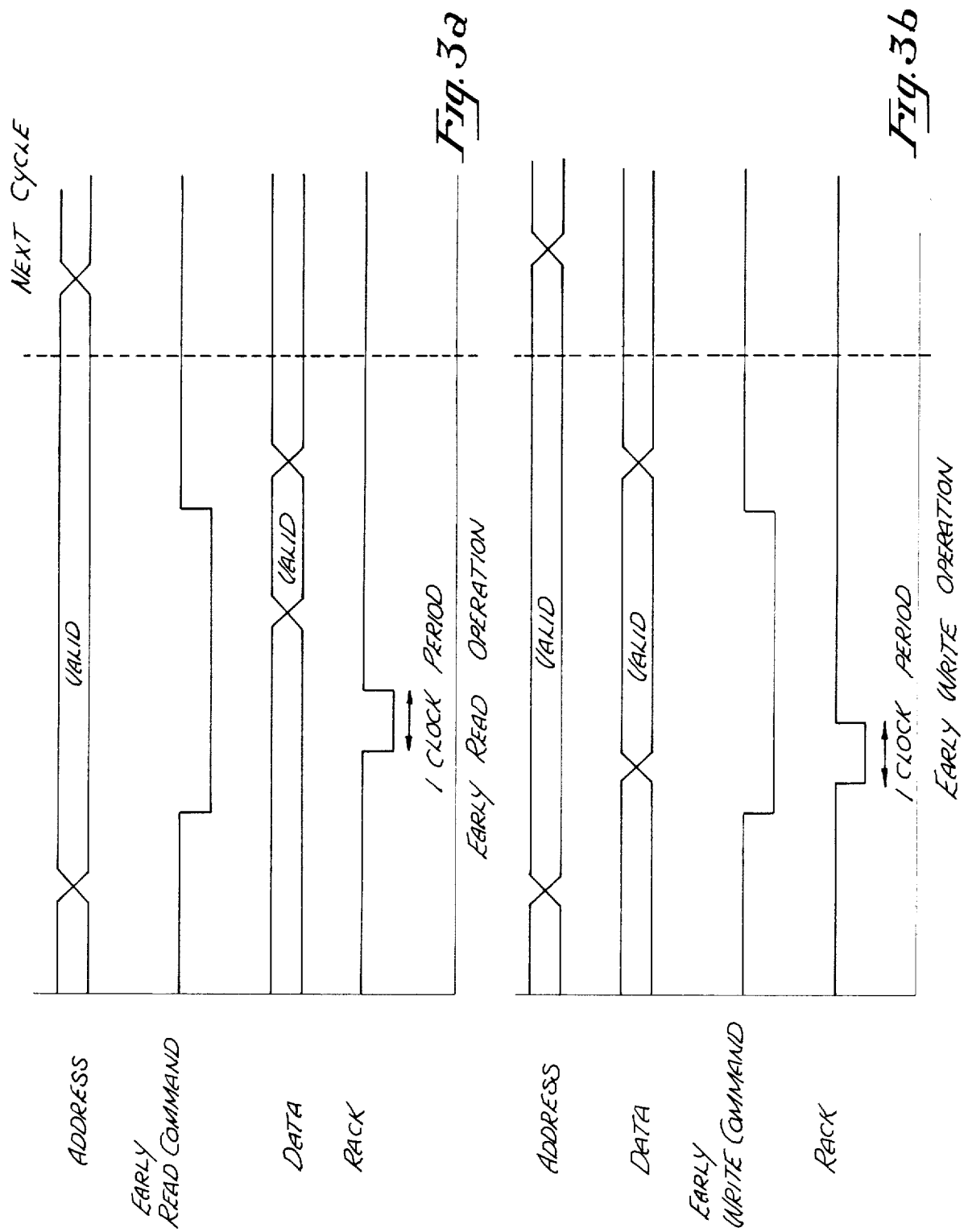
FIG. 3a is a timing diagram of the READ operation on the memory bus of the present invention.
FIG. 3b is a timing diagram of the WRITE operation on the memory bus of the present invention.

When a memory bank receives an appropriate address, the BHEN signal, and an MRD or MWT command, the memory bank responds back over the memory bus interface 20 with a RAM acknowledgement signal, RACK, to signal the microprocessor 1 that the memory bank will be ready to complete the READ or WRITE cycle. The RACK signal is synchronized with the microprocessor 1 system clock, which is also provided to the memory bus. Utilizing the master clock signal from the microprocessor circuit board, the selected memory bank operates synchronously with the microprocessor. This ensures maximum throughput during READ or WRITE operations. The RAM acknowledgment signal, RACK, is only asserted long enough to be recognized by the microprocessor 1, which in the preferred embodiment is approximately 125 nanoseconds, or one clock period, and thus is asserted shortly after the MRD or MWT command line is asserted, as shown in FIGS. 3a and 3b. As noted previously, in the standard unified bus protocol, the XACK acknowledgment signal is not asserted until after a READ or WRITE operation has been completed. Thus, with the improved memory bus of the present invention, the microprocessor 1 receives an early acknowledgment that the READ or WRITE operation has commenced. That is, the RACK signal is generated a fixed time prior to the completion of the READ or WRITE operation. Therefore the microprocessor 1 can be (and is) programmed to respond on the assumption that the operation will finish, and thus the next cycle can be started. This anticipation typically saves one or two time periods, or "wait" states, compared to the prior art.

One of the primary advantages of the inventive memory bus is the generation of early MRD and MWT signals. The Early READ/WRITE logic circuit 12, shown in FIG. 4, essentially is simple, combinatorial logic that very rapidly decodes the value of the status line 13 from the microprocessor 1 to generate Early READ or Early WRITE signals immediately after the status lines are valid. The logic elements in the area marked 40 generate the Early READ and Early WRITE signals. These signals are respectively logically OR'd with the standard READ command, BMRDC, and WRITE command, BMWCT, generated by the arbitration and control circuit 17 in known fashion.

The generation of an Early READ signal is typically 100 nanoseconds before the arbitration and control circuit 17 asserts the standard BMRDC signal for a READ operation (called a "Delayed READ"). The generation of an Early WRITE signal is typically 160 nanoseconds before the assertion of the standard BMWCT signal for a WRITE operation (called a "Delayed WRITE"). The Early READ and Early WRITE signals save one clock period per memory bus cycle, which results in a 17% to 25% decrease in the time it takes to complete one memory bus cycle compared to cycles where a Delayed READ or Delayed WRITE signal is generated by the arbitration and control circuit 17.

An exception to the normal operation sequence occurs when either the microprocessor 1 is not master of the unified bus, or another subsystem coupled to the unified bus is requesting that it be made master of the unified bus near the commencement of a READ or WRITE operation. In such a case, the arbitration and control circuit 17 cannot guarantee that the microprocessor 1 is the bus master until after an Early READ or Early WRITE signal normally would have been asserted. Therefore, the Early READ/WRITE logic circuit 12 is designed to detect such arbitration conflicts.

Figure 4:
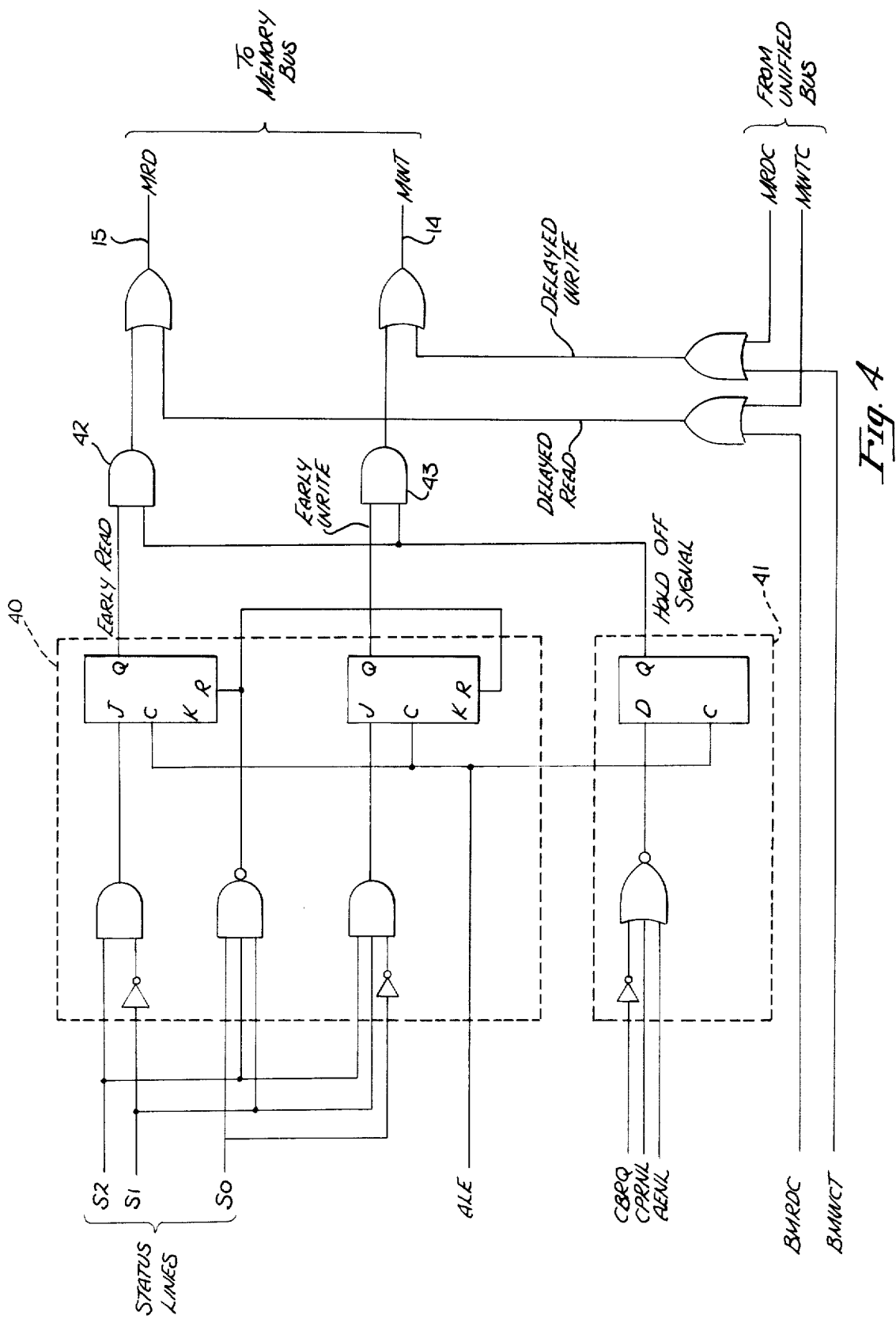
FIG. 4 is a schematic diagram of the Early READ/WRITE circuit of the present invention.

The logic elements in the area in FIG. 4 marked 41, when enabled by a standard AENL signal generated by the arbitration and control circuit 17, monitors two of the standard unified bus arbitration and control signals, the common bus request, CBRQ, and the bus priority input signal, BPRNL. The AENL signal indicates that another subsystem is the bus master. The CBRQ signal indicates that another subsystem is requesting mastership of the unified bus. The BPRNL signal indicates whether a requesting subsystem has a higher priority than the present bus master. These later two signals are sampled along with the status lines near the start of every memory bus cycle, when the address latch signal, ALE, generated by the arbitration and bus controller circuit 17 is asserted. If either CBRQ or BPRN are asserted at this time, a HOLD-OFF signal is generated by the logic elements in the area marked 41 in FIG. 4, which disables AND gates 42 and 43 and prevents the assertion of the Early READ or Early WRITE signals to the memory bus interface 20. If the arbitration and control circuit 17 resolves the bus mastership in favor of the microprocesser 1, the standard BMRDC or BMWCT signal from the arbitration and control circuit 17 is asserted through the Early READ/WRITE circuitry 12 to generate the respective MRD or MWT signal to the memory. If bus mastership is not resolved in favor of the microprocesser 1 during such a situation, then the DMA condition prevails.

During the DMA condition, all of the address and data signals of the unified bus are passed to the inventive memory bus, along with the several control signals. The address lines 8 of the unified bus interface 21 are therefore coupled through the address transciever 7 to twenty of the twenty-four address lines of the memory bus interface 20. (In some embodiments of the present invention, the address lines may be inverted first). The data lines 10 of the unified bus interface 21 are coupled through the unified bus data transciever 9 to the memory bus interface 20.

The READ/WRITE command signals (MRDC and MWTD, respectively) from the unified bus are applied to the Early READ/WRITE logic circuit 12. The MRDC and MWTC commands from the unified bus are logically OR'd with the BMRDC and BMWTC signal lines, respectively, from the arbitration and control circuit 17, to also produce a Delayed READ or Delayed WRITE signal, which are then logically OR'd with the Early READ and Early WRITE signals to generate either the memory read signal, MRD 15, or the memory write signal, MWT 14, to the memory bus interface 20. Thereafter, the XACK acknowledgment signal and the standard unified bus protocol are used rather than the RACK acknowledgment signal protocol of the present invention. The timing of address, data, and control signals over the memory bus adheres to the unified bus protocol.

While a wide variety of circuits and other configurations can be used in this invention, it should be understood that changes can be made without departing from the spirit or scope of the invention. Thus, this invention is not to be limited to the specific embodiment discussed and illustrated herein, but rather by the following claims.

We claim:
1. A microprocessor system comprising:
  a. a microprocessor having status information output indicative of an impending read or write operation and further generating standard read and write commands;
  b. a unified standard bus coupled to the microprocessor and to at least one external source of command information, including standard read and write commands;
  c. a memory bus coupled to the microprocessor;
  d. a first detection circuit coupled to the microprocessor and to the memory bus for receiving the status information, generating an early command signal in response to the status information and indicative of a read or write operation, and transmitting that early command signal by means of the memory bus prior to the generation of the corresponding standard command;
  e. an addressable memory, coupled to the memory bus, including means for receiving read and write command signals and means for performing read write operations in response to received read and write command signals, means for generating an acknowledgment signal in response to a received read or write command signal and prior to the completion of the commanded read or write operation, and means for transmitting the acknowledge- ment signal by means of the memory bus to the microprocessor, whereby the microprocessor, upon receipt of the acknowledgement signal, is enabled to output further status information indicative of a next impending read or write operation;

f. a second detection circuit coupled to the microprocessor, the unified standard bus, and the first detection circuit for receiving command information over the unified standard bus indicative of a conflict between the microprocessor and an external source of command information with respect to control of the unified standard bus and for generating a control signal for preventing the first detection circuit from supplying an early command signal to the addressable memory; and g. means to electrically couple the unified standard bus to the memory bus, and wherein, in response to the control signal from the second detection circuit, the addressable memory is enabled to be directly responsive to standard read and write commands from an external source of command information for reading or writing data by means of the memory bus to or from the unified standard bus.

* * * * *